Nov. 12, 1963
J. T. ARNOLD
3,110,858
GYROMAGNETIC RESONANCE APPARATUS
Filed Dec. 19, 1957
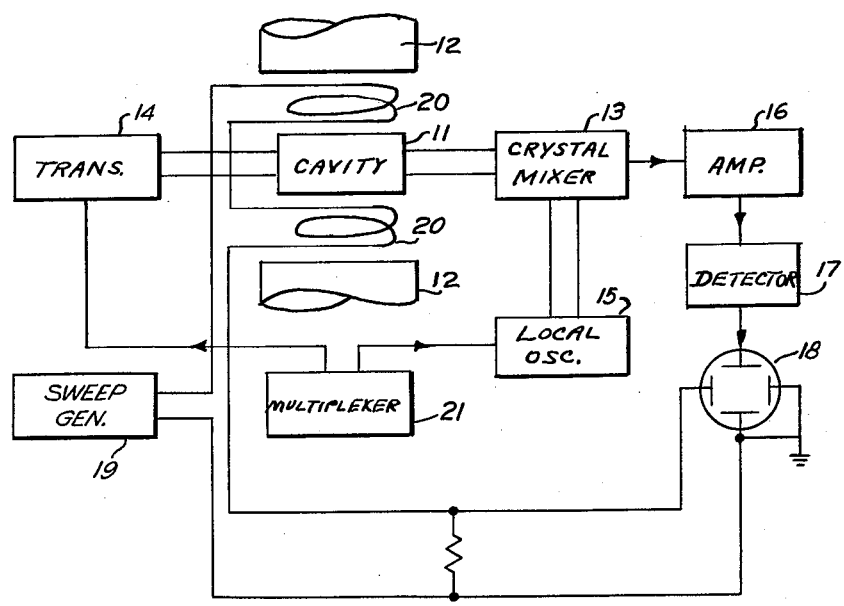
INVENTOR
James T. Arnold
by Wm J. Nolan
Attorney 3,110,858
GYROMAGNETIC RESONANCE APPARATUS
James T. Arnold, Corvallis, Oreg., assignor to Varian Associates, Palo Alto, Calif., a corporation of California
Filed Dec. 19, 1957, Ser. No. 703,832
1 Claim. (Cl. 324—.5)

The present invention relates in general to gyromagnetic resonance apparatus and more particularly to a novel apparatus for producing and detecting gyromagnetic resonance in various materials, such apparatus being useful for chemical analysis, process control, magnetic field measurements and other uses.

In gyromagnetic resonance systems now in present use, such as, for example, electron paramagnetic resonance spectrometers, the sample of matter of interest is placed in a polarizing magnetic field to polarize the magnetic moments of the atomic constituent particles or atom portions. A radio frequency magnetic field at the resonance frequency of the atom portions in the polarizing field is applied to the sample at an angle to the polarizing field to produce a gyromagnetic resonance of the atom portions. The gyromagnetic resonance effect is measured by various electromagnetic detecting methods.

These previous systems employ a continuously running transmitter for supplying the driving radio frequency field to the sample of matter and there is always a problem of direct leakage between the transmitter and the receiver circuits. This leakage tends to mask the gyromagnetic resonance signal in the receiver since the transmitter frequency is, of course, the same frequency as the resonance signal and, in most cases, is considerably stronger than the gyromagnetic resonance signal. Another way of looking at this problem is to consider the R.F. leakage between the transmitter and receiver as undesired noise in the receiver circuit which masks the gyromagnetic resonance signal. The present invention provides a novel electron paramagnetic resonance system for utilization in lieu of the prior systems wherein these noise problems are substantially eliminated. A definite improvement in decoupling between the transmitter and receiver components, even in the presence of severe mechanical vibration or thermal changes, is accomplished.

It is therefore the principal object of the present invention to provide a novel improved electron paramagnetic resonance system useful in chemical analysis, process control, magnetic field measurements and other similar applications.

One feature of the present invention is the provision of an electron paramagnetic resonance apparatus whereby the transmitter means of the system and the receiver means of the system are operated alternately in cyclical manner such that while one is energized the other is de-energized and vice versa with the result that at no time is there any radio frequency coupling between the transmitter and receiver means.

Another feature of the present invention is the provision of a novel apparatus of the above featured type wherein a pulse control circuit is utilized to alternately energize and de-energize the transmitter and receiver means.

Still another feature of the present invention is the provision of a novel electron paramagnetic resonance apparatus of the above featured types for utilization in resonant cavity gyromagnetic resonance systems.

Other features and advantages of the present invention will become apparent upon a perusal of the following specification taken in connection with the accompanying drawings depicting a block diagram of an electron paramagnetic resonance spectrometer which embodies the present invention.

Referring now to the FIGURE there is shown one embodiment of the present invention wherein the sample of matter is positoined in a cavity resonator 11 between the pole faces of a magnet 12 producing a suitable unidirectional polarizing magnetic field, for example, about 3,000 gauss. The cavity resonator 11 is tuned to the electron paramagnetic resonance frequency of the atom portions of the sample in the unidirectional magnetic field. The resonator 11 is coupled to the output of a radio frequency transmitter 14 which includes a suitable source supplying the necessary weak driving radio frequency magnetic field to the sample for example, about 10 kmc. The cavity 11 is also coupled to a crystal mixer 13 to which a signal of about 10.030 kmc. is transmitted from a local oscillator 15. Also coupled to the crystal mixer is an amplifier 16 which amplifies the gyromagnetic resonance signal produced by the atom portions at resonance. The output of this amplifier circuit 15 is coupled to a detector 17 where the radio frequency gyromagnetic resonance signal is demodulated, the envelope signal being transmitted to a display such as an oscilloscope 18 or other suitable recording device. In accordance with standard gyromagnetic resonance spectrometer art, the unidirectional magnetic field produced by magnet 12 is modulated at an audio rate by an audio signal from generator 19 through sweep coils 20 such that the point of resonance is swept through, the audio frequency signal also being transmitted to the horizontal sweep plates of oscilloscope 18.

The amplifier stages in the transmitter 14 and the local oscillator 15 are coupled to a pulse generator or multiplexer circuit 21. The purpose of the multiplexer circuit is to provide gating pulses for alternately energizing the transmitter and the receiver stages. In this manner, during the period of time $\tau_1$, the transmitter 14 transmits the radio frequency energy to the resonator 11 and the local oscillator 15 is cut off and no 30 mc. signal reaches 30 mc. amplifier 16, and the detector 17 is therefore insensitive to the direct transmitter signal. During the next interval of time $\tau_2$, the multiplexer operates to render the amplifier stages in the transmitter 14 non-operating and the local oscillator 15 operative so that any electron resonance at 10 kmc. is mixed with 10.030 kmc. and a 30 mc. signal then passes on to the amplifier and detector. Since the R.F. transmitter is de-energized during the time the receiver stage is amplifying the resonance signal, there is no leakage of radio frequency driving energy between the transmitter 14 and the detector 17 and thus there is no problem of balancing or noise cancellation in this system.

Provided that $\tau_1$, $\tau_2$ or $\tau_1+\tau_2 \ll T_2$, where $T_2$ is the well known transverse relaxation time or spin-spin relaxation time of the sample, the behavior of this gyromagnetic resonance system can be described by the fundamental equations governing gyromagnetic resonance systems such as found in the theoretical paper by Felix Bloch, in the Physical Review, vol. 70, pages 460–474 (1946). Typical times for $\tau_1$ and $\tau_2$ are $\tau_1=\tau_2=10^{-6}$ seconds. The pulses occur so quickly that the resonance frequency of the sample is in phase coherence with the transmitter frequency and the frequency received by the receiver is that of the transmitter, along with side bands containing the spectrum information.

It should be noted that there is no problem of amplifier saturation in the receiver since it is exposed only to the gyromagnetic resonance signal and not to the resonance signal plus some fraction of the transmitter signal which is in most cases much larger than the resonance signal.

Rather than coupling the multiplexer 21 to the local oscillator 15 as shown in the drawings, it could be coupled to one or more of the stages in the amplifier 16 to accomplish the same result.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

An electron paramagnetic resonance spectrometer system for producing gyromagnetic resonance in a sample aligned in a polarizing magnetic field comprising a radio frequency cavity resonator adapted to contain said sample, a radio frequency transmitter means coupled to said resonator for supplying a radio frequency magnetic field to said sample at an angle to said alignment direction and of the Larmor frequency of said sample to thereby produce resonance, receiver means coupled to said resonator to measure the electromagnetic signal responsive to said resonance, and means for rendering said transmitter means and said receiver means operable alternately in cyclical manner such that while one is operative the other is non-operative and vice versa, said means rendering said transmitter means operative during a period $\tau_1$ and said receiver means operative during a period $\tau_2$ in each cycle such that $\tau_1 + \tau_2 \ll T_2$ where $T_2$ is the transverse or spin-spin relaxation time of the substance, said receiver means including a mixer coupled to said cavity resonator and a local oscillator coupled to said mixer and to said means for rendering said transmitter and said receiver means operable alternately.

References Cited in the file of this patent

UNITED STATES PATENTS

| 2,832,061 | Garwin et al. | Apr. 22, 1958 |
| 2,837,712 | Mackey | June 3, 1958 |
| 2,878,443 | Schuster | Mar. 17, 1959 |

FOREIGN PATENTS

| 1,139,641 | France | Feb. 18, 1957 |
| 791,866 | Great Britain | Mar. 12, 1958 |

OTHER REFERENCES

Hahn: Physical Review, vol. 77, No. 2, Jan. 15, 1950, pp. 297–8.

Malling: Electronics, June 1954, pp. 134–137.

Hahn: The Review of Scientific Instruments, vol. 28, No. 10, October 1957, pp. 780 to 789.

Bloembergen et al.: Physical Review, vol. 93, No. 1, Jan. 1, 1954, pp. 72 to 83 incl.

Carr et al.: Physical Review, vol. 94, No. 3, May 1, 1954, pp. 630 to 638.